(12) United States Patent
Onoe

(10) Patent No.: US 10,982,953 B2
(45) Date of Patent: Apr. 20, 2021

(54) MEASURING DEVICE, IMAGE FORMING APPARATUS, AND MEASURING METHOD

(71) Applicant: Konica Minolta, Inc., Tokyo (JP)

(72) Inventor: Taro Onoe, Saitama (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/931,101

(22) Filed: May 13, 2020

(65) Prior Publication Data

US 2020/0378753 A1 Dec. 3, 2020

(30) Foreign Application Priority Data

May 27, 2019 (JP) .............................. JP2019-098372

(51) Int. Cl.
| | |
|---|---|
| *G03G 15/08* | (2006.01) |
| *G01B 11/00* | (2006.01) |
| *G01B 11/24* | (2006.01) |
| *G03G 15/00* | (2006.01) |
| *G01B 11/14* | (2006.01) |

(52) U.S. Cl.
CPC ............ *G01B 11/24* (2013.01); *G01B 11/005* (2013.01); *G01B 11/14* (2013.01); *G03G 15/0806* (2013.01); *G03G 15/0813* (2013.01); *G03G 15/50* (2013.01)

(58) Field of Classification Search
CPC ........... G03G 15/0806; G03G 15/0813; G03G 15/0896; G01B 11/002; G01B 11/005; G01B 11/08; G01B 11/14; G01B 11/24

USPC .................................. 399/279; 356/606, 614
See application file for complete search history.

(56) References Cited

U.S. PATENT DOCUMENTS

| | | | | | |
|---|---|---|---|---|---|
| 4,575,945 | A | * | 3/1986 | Rigler ..................... | G01B 5/14 33/657 |
| 5,155,444 | A | * | 10/1992 | Green ...................... | G01B 7/14 324/661 |
| 6,397,025 | B1 | * | 5/2002 | Higeta ............... | G03G 21/1832 399/109 |

(Continued)

FOREIGN PATENT DOCUMENTS

| | | | |
|---|---|---|---|
| JP | H05340723 A | | 12/1993 |
| JP | 11272073 A | * | 10/1999 |

(Continued)

*Primary Examiner* — Robert B Beatty
(74) *Attorney, Agent, or Firm* — Osha Bergman Watanabe & Burton LLP

(57) ABSTRACT

A measuring device that measures a distance between a first measurement target and a second measurement target. The measuring device includes a CPU that: calculates a first surface shape of the first measurement target based on first measurement data acquired from a first line sensor that emits first laser light to the first measurement target, and calculates a second surface shape of the second measurement target based on second measurement data acquired from a second line sensor that emits second laser light to the second measurement target; transforms at least one of a first coordinate system of the first line sensor and a second coordinate system of the second line sensor, to form a unified coordinate system; and calculates a distance between the first measurement target and the second measurement target in the unified coordinate system.

12 Claims, 12 Drawing Sheets

(56) References Cited

U.S. PATENT DOCUMENTS

2015/0300800 A1* 10/2015 VanValkenburgh ..... G01B 7/14
324/207.17
2016/0109823 A1* 4/2016 Judd ................ G03G 15/04054
347/118
2018/0347973 A1* 12/2018 Sasano ................... G01B 17/02
2020/0264534 A1* 8/2020 Ohashi ............... G03G 15/0812

FOREIGN PATENT DOCUMENTS

| JP | 2002148023 | A | * | 5/2002 |
| JP | 2007322566 | A | | 12/2007 |
| JP | 2010128457 | A | * | 6/2010 |

* cited by examiner

MEASURING DEVICE, IMAGE FORMING APPARATUS, AND MEASURING METHOD

CROSS-REFERENCE TO RELATED APPLICATION

The entire disclosure of Japanese patent Application No. 2019-098372, filed on May 27, 2019, is incorporated herein by reference.

BACKGROUND

Technical Field

The present invention relates to a measuring device, an image forming apparatus, and a measuring method.

Description of the Related Art

JP 5-340723 A (claim 1) discloses "a spacing length measuring method for measuring the length of a measurement target spacing by placing an illuminating means on one side of the measurement target spacing, illuminating a diffusing surface with the illuminating means through the measurement target spacing, and capturing a silhouette image of the spacing".

JP 2007-322566 A (claim 1) discloses "a developing device including: a developing roller that is disposed to face an image carrier and supplies toner to the image carrier; a magnetic roller that is disposed to face the developing roller and supplies toner to the developing roller; a frame that holds the developing roller and the magnetic roller, with a distance being kept in between; and a reflector that is provided in the frame, and measures the distance between the developing roller and the magnetic roller".

In an electrophotographic image forming apparatus, an electrically charged photosensitive member is exposed, so that an electrostatic latent image is formed. Toner is then supplied to the electrostatic latent image on the photosensitive member with a developing roller, so that development is performed, and a toner image is formed. A distance between the photosensitive member and the developing roller disposed in the image forming apparatus is a parameter directly related to development density. For this reason, highly accurate measurement and adjustment (±30 µm) are required for a distance between the photosensitive member and the developing roller, and a device for measuring the distance with high precision is needed.

As shown in FIG. 13, according to a conventional distance measuring method, an irradiation device 100-1 emits laser light L1 having a certain width through a space between a photosensitive member 50 and a developing roller 60, and a light receiving device 100-2 receives laser light L2 that has passed through the space between the photosensitive member 50 and the developing roller 60, and measures the width Ds of the light. As a result, the distance between the photosensitive member 50 and the developing roller 60 is measured as Ds.

Further, in recent years, an image forming apparatus in which two developing rollers are attached to one photosensitive member has been developed. Such an image forming apparatus also needs a device that measures a distance between the photosensitive member and each developing roller with high precision. However, when a distance Ds between a photosensitive member 50 and a developing roller 70 is measured by a conventional distance measuring method implemented for the photosensitive member 50 and two developing rollers 70 and 80 attached to the photosensitive member 50, the developing roller 80 blocks laser light L1 emitted by an irradiation device 100-1, as shown in FIG. 14. Therefore, a light receiving device 100-2 cannot receive laser light, and cannot measure the distance Ds. Although the photosensitive member 50 and the developing rollers 70 and 80 each have a cylindrical surface shape, the same thing also happens in a case where a distance between two measurement targets having any surface shape is measured.

SUMMARY

One or more embodiments of the present invention measure a distance between two measurement targets.

According to one or more embodiments of the present invention, a measuring device that measures a distance between a first measurement target and a second measurement target comprises a hardware processor (or CPU) that: calculates a surface shape of the first measurement target on the basis of first measurement data acquired from a first line sensor that emits laser light to the first measurement target, and calculates a surface shape of the second measurement target on the basis of second measurement data acquired from a second line sensor that emits laser light to the second measurement target; transforms at least one of a first coordinate system of the first line sensor and a second coordinate system of the second line sensor, to form a unified coordinate system; and calculates a distance between the first measurement target and the second measurement target in the unified coordinate system. One or more embodiments provide practical improvements to measurement technologies by providing increased accuracy and precision for measuring distance between a photosensitive member and a developing roller.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
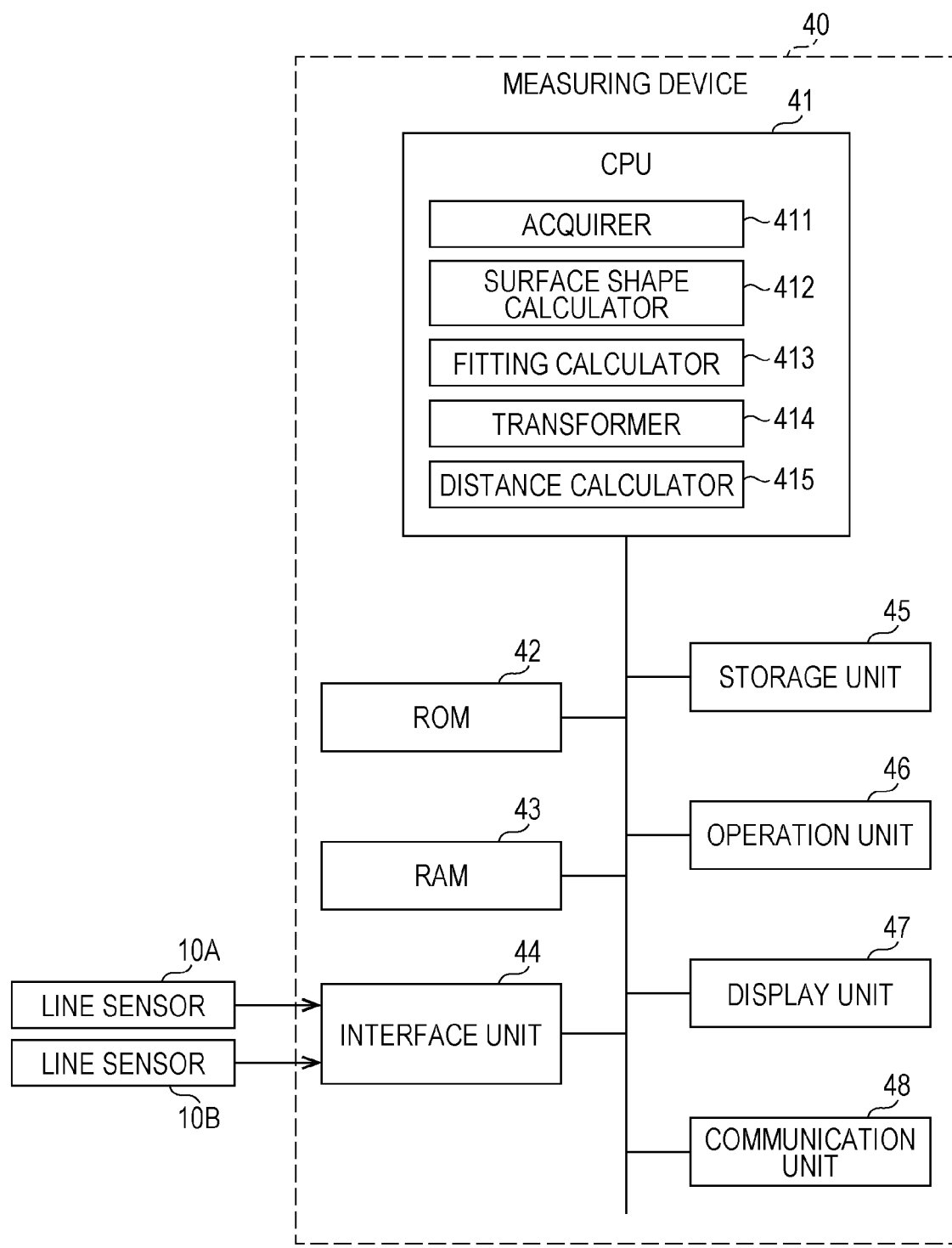
FIG. 1 is a functional configuration diagram of a measuring device according to one or more embodiments.

Hereinafter, embodiments of the present invention will be described with reference to the drawings. However, the scope of the invention is not limited to the disclosed embodiments. In the description below with reference to the drawings, like components are denoted by like reference numerals, and explanation of those components will not be repeated twice or more. The dimensional ratios in the drawings are exaggerated for ease of explanation, and may differ from the actual dimensional ratios.

[Measuring Device]

As shown in FIG. 1, a measuring device 40 of one or more embodiments includes a central processing unit (CPU) 41, a read only memory (ROM) 42, a random access memory (RAM) 43, an interface unit 44, a storage unit 45, an operation unit 46, a display unit 47, and a communication unit 48.

The CPU 41 comprehensively controls processing operations of the respective components of the measuring device 40. Specifically, the CPU 41 loads various processing programs stored in the ROM 42 into the RAM 43, and performs various processes in cooperation with the programs.

The ROM 42 stores the various processing programs, and parameters, files, and the like necessary for executing the programs.

In the various processes to be controlled by the CPU 41, the RAM 43 forms a work area that temporarily stores the various programs, input data, output data, parameters, and the like read from the ROM 42.

The interface unit 44 is an interface that performs data communication with line sensors 10A and 10B connected via a cable (not shown), and acquires measurement data from the line sensors 10A and 10B.

The storage unit 45 is formed with a hard disk drive (HDD), a nonvolatile semiconductor memory, or the like, and stores various kinds of data.

The operation unit 46 includes a keyboard having cursor keys, character input keys, various function keys, and the like, and a pointing device such as a mouse, and outputs an operation signal input by a key operation performed on the keyboard or by a mouse operation, to the CPU 41. Alternatively, the operation unit 46 may be formed with a touch screen stacked on the display unit 47, and output an operation signal to the CPU 41 in accordance with the position of a touch operation performed with an operator's finger or the like.

The display unit 47 includes a monitor such as a liquid crystal display (LCD), and displays various screens in accordance with instructions indicated by display signals input from the CPU 41.

The communication unit 48 includes a network interface and the like, and exchanges data with an external device connected thereto via a communication network such as a local area network (LAN), a wide area network (WAN), or the Internet.

As shown in FIG. 1, the CPU 41 includes functional units such as an acquirer 411, a surface shape calculator 412, a fitting calculator 413, a transformer 414, and a distance calculator 415.

The acquirer 411 acquires measurement data from the line sensors 10A and 10B.

The surface shape calculator 412 calculates a surface shape of the measurement target, on the basis of the measurement data acquired by the acquirer 411. In a case where the measurement target has a cylindrical surface shape, the surface shape calculator 412 can calculate the surface shape of the circular arc in a circumferential direction.

The fitting calculator 413 performs fitting by a non-linear least-squares method on the surface shape measured by the surface shape calculator 412. In a case where the measurement target has a cylindrical surface shape, the fitting calculator 413 can determine the center and the radius of the circumference including the arc of the surface shape measured by the surface shape calculator 412.

The transformer 414 transforms the coordinate systems (a first coordinate system and a second coordinate system) of the line sensors 10A and 10B. For example, the transformer 414 can transform the coordinate system of the line sensor 10A into the coordinate system of the line sensor 10B, to unify the coordinate systems. Alternatively, the transformer 414 can transform at least one of the coordinate systems of the line sensor 10A and the line sensor 10B, to unify the coordinate systems.

The distance calculator 415 calculates the distance between measurement targets in the unified coordinate system, on the basis of the result of processing performed by the fitting calculator 413 and the transform performed by the transformer 414.

[Line Sensors]

Figure 2:
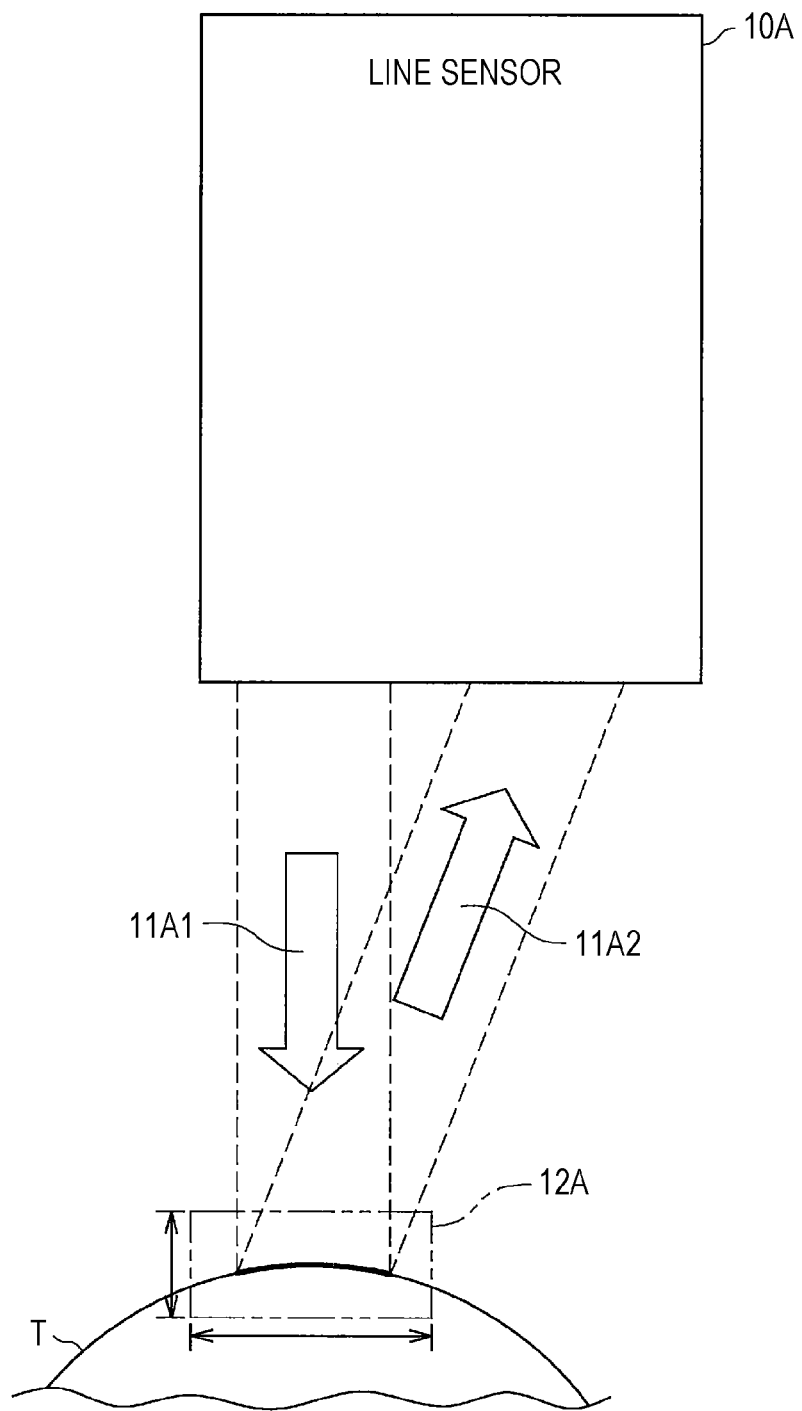
FIG. 2 is a diagram for explaining a line sensor according to one or more embodiments.

As shown in FIG. 2, the line sensor 10A irradiates a measurement target T with belt-like laser light 11A1, and receives laser light 11A2 reflected by the measurement target T, to detect the surface shape (boundary) facing the line sensor 10A in the entire surface of the measurement target T. A measurement region 12A that is at a predetermined distance from the line sensor 10A is set for the line sensor 10A. The line sensor 10A is disposed so that the measurement region 12A includes the surface of the measurement target T. The line sensor 10A measures the distance to the surface of the measurement target T by irradiation of the laser light 11A1 and reception of the reflected laser light 11A2, so that the surface shape calculator 412 can calculate the surface shape of the measurement target T included in the measurement region 12A.

The line sensor 10A can measure the surface shape of the measurement target T as measurement data (x, y) of the two-dimensional coordinates on which the belt-like laser light 11A1 has been emitted. In the line sensor 10A, measurement data (first measurement data) can be generated, with the direction of irradiation of the laser light 11A1 being the y-axis, the axis orthogonal to the y-axis being the x-axis, for example. The x-axis coincides with the width direction of the belt of the laser light 11A1. Further, the center of the measurement region 12A can be set as the origin, for example, and a two-dimensional coordinate system having the x-axis, the y-axis, and the origin is defined for the line sensor 10A.

The line sensor 10B is a component that is the same as the line sensor 10A. Accordingly, the above description regarding the line sensor 10A also applies to the line sensor 10B. In the line sensor 10B, measurement data (second measurement data) can be generated, with the direction of irradiation of the laser light being the y-axis, the axis orthogonal to the y-axis being the x-axis, for example.

[Distance Measurement System]

Figure 3:
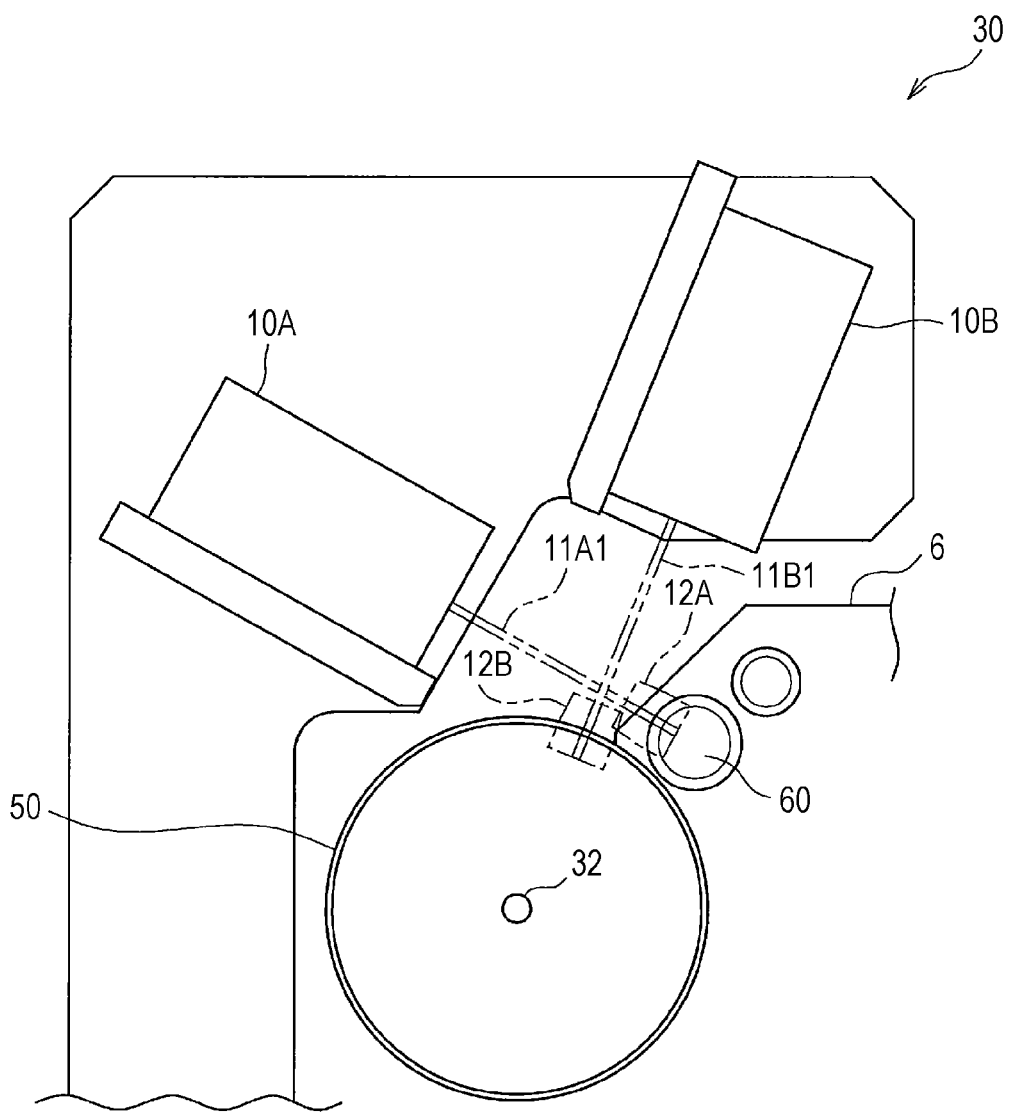
FIG. 3 is a diagram of a measurement system for measuring a distance between a photosensitive member and a developing roller according to one or more embodiments.

As shown in FIG. 3, a distance between a photoreceptor or photosensitive member 50 (a second measurement target) having a cylindrical surface shape and a developing roller 60 (a first developing roller: a first measurement target) having a cylindrical surface shape is measured. In a case where the position of the two targets is to be adjusted, a measurement system in which the photosensitive member 50 and the line sensors 10A and 10B are mounted on an assembly jig 30 can be used, for example. Further, a developing device 6 including the developing roller 60 is attached to the photosensitive member 50 on the assembly jig 30. A photosensitive member holding shaft 32 extending from the assembly jig 30 is inserted through the central shaft of the photosensitive member 50, so that the photosensitive member 50 is mounted on the assembly jig 30.

The line sensor 10A is mounted on the assembly jig 30 at such a position that the line sensor 10A can emit the laser light 11A1 onto the surface portion included in the measurement region 12A in the surface of the developing roller 60, and receive the laser light reflected by the developing roller 60. The line sensor 10B is mounted on the assembly jig 30 at such a position that the line sensor 10B can emit laser light 11B1 onto the surface portion included in a measurement region 12B in the surface of the photosensitive member 50, and receive the laser light reflected by the photosensitive member 50. Since the line sensors 10A and 10B are mounted on the plate-like assembly jig 30, the plane of the two-dimensional coordinate system of each of the line sensors 10A and 10B is the same.

Figure 4:
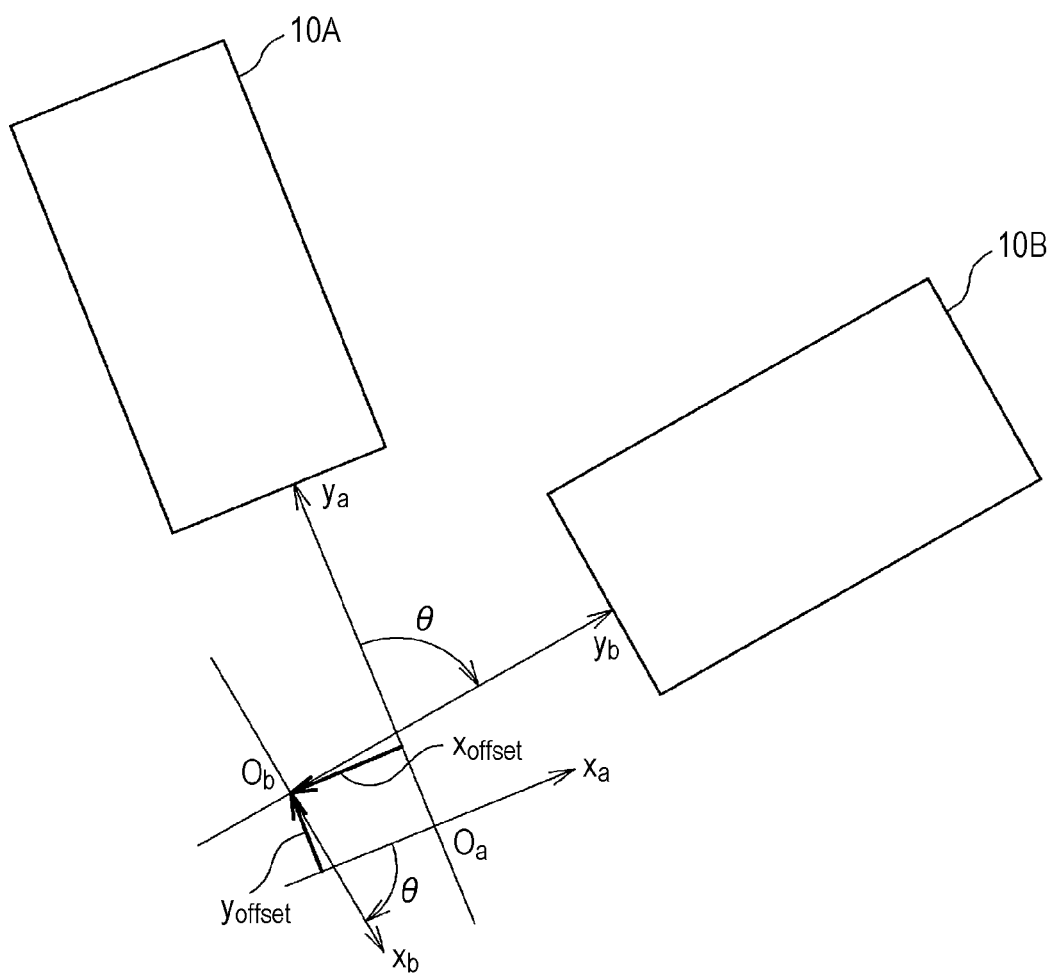
FIG. 4 is a diagram illustrating a relationship between two coordinate systems for two line sensors according to one or more embodiments.

As shown in FIG. 3, the line sensors 10A and 10B are disposed at different positions, and it is necessary to determine the positional relationship between the line sensors 10A and 10B. As shown in FIG. 4, the x-axis, the y-axis, and the origin of the line sensor 10A are an $x_a$-axis, a $y_a$-axis, and $O_a$, respectively, and the x-axis, the y-axis, and the origin of the line sensor 10B are an $x_b$-axis, a $y_b$-axis, and $O_b$, respectively. In this case, the angle θ of the $x_b$-axis with respect to the $x_a$-axis, and the relative position ($x_{offset}$, $y_{offset}$) of the origin $O_b$ with respect to the origin $O_a$ are determined. The angle θ is also the angle of the $y_b$-axis with respect to the $y_a$-axis.

Figure 5:
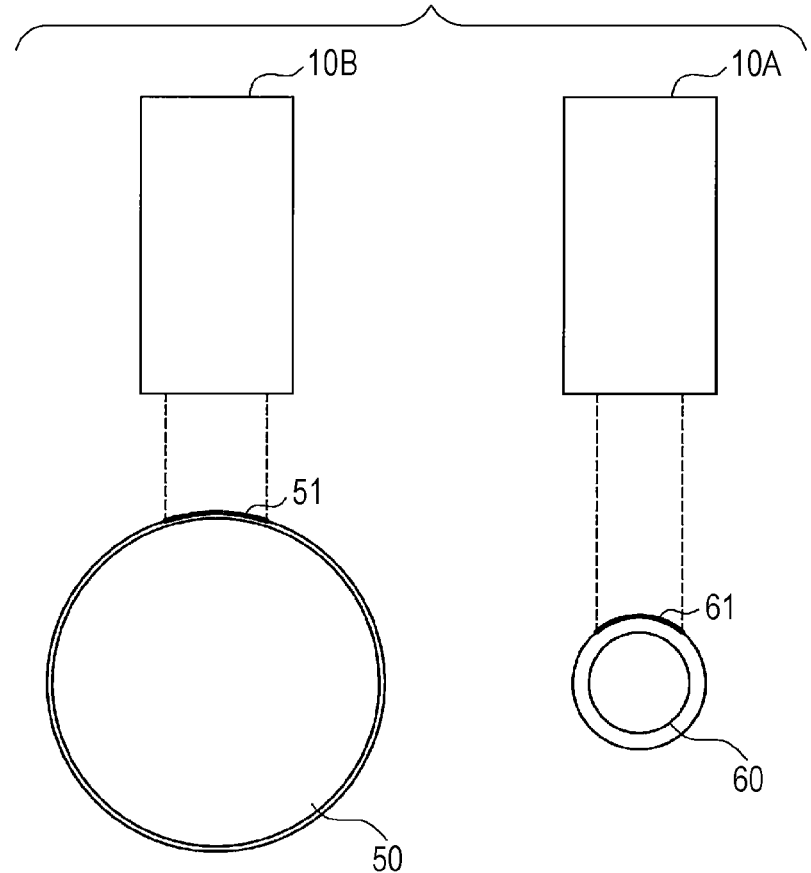
FIG. 5 is a diagram showing a surface shape of the photosensitive member and a surface shape of the developing roller that have been measured from measurement data according to one or more embodiments.

As shown in FIG. 5, the line sensor 10A measures the surface shape 61 of the developing roller 60, independently of the line sensor 10B. The line sensor 10B measures the surface shape 51 of the photosensitive member 50, independently of the line sensor 10A. Normally, surface shapes of two measurement targets are measured by the respective line sensors 10A and 10B independently of each other. The surface shape calculator 412 of the measuring device 40 can determine the surface shapes 61 and 51 on the basis of the measurement data acquired from the line sensors 10A and 10B.

In a case where the line sensors 10A and 10B perform measurement independently of each other, the measuring device 40 is not able to measure the distance between the photosensitive member 50 and the developing roller 60 without any adjustment, because the respective two-dimensional coordinate systems of the line sensors 10A and 10B are different. Therefore, it is necessary to measure the relative positional relationship between the coordinate systems of the line sensors 10A and 10B in advance, and unify the coordinate systems. When the distance between the photosensitive member 50 and the developing roller 60 in the measurement system shown in FIG. 3 is measured, the angle θ and the relative position ($x_{offset}$, $y_{offset}$) shown in FIG. 4 have been determined, and accordingly, the relative positional relationship between the coordinates systems of the line sensors 10A and 10B has already been measured. Thus, these two coordinate systems can be unified.

Figure 6:
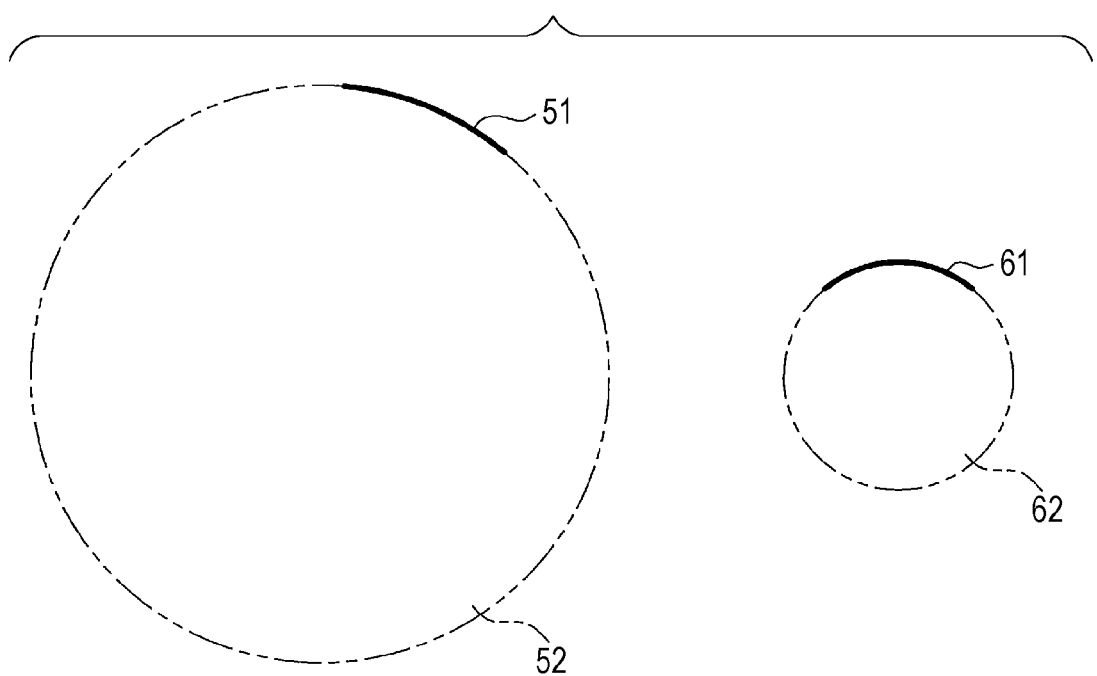
FIG. 6 is a diagram showing a result of fitting for a circular shape by a non-linear least-squares method according to one or more embodiments.

Specifically, first, the fitting calculator 413 of the measuring device 40 performs fitting for a circular shape on the measured surface shapes 51 and 61 (FIG. 5) by the non-linear least-squares method. In a case where this fitting converges, circular section data (dashed lines) 52 (a second circular section) and 62 (a first circular section) including the surface shapes 51 and 61 as arcs can be acquired, as shown in FIG. 6.

Next, in a first step of transforming the coordinate system of the line sensor 10A, the transformer 414 of the measuring device 40 causes the coordinates ($x_i$, $y_i$) (i=1, 2, . . . , the number of pieces of measurement data of the line sensor 10A) of respective points on the surface shape 61 to rotate by the angle θ about the origin $O_a$ of the coordinate system of the line sensor 10A. The coordinates of each point on the rotated surface shape 61 are expressed as:

$$\begin{pmatrix} \cos\theta & -\sin\theta \\ \sin\theta & \cos\theta \end{pmatrix} \begin{pmatrix} x_i \\ y_i \end{pmatrix} \qquad \text{[Mathematical Formula 1]}$$

Figure 7:
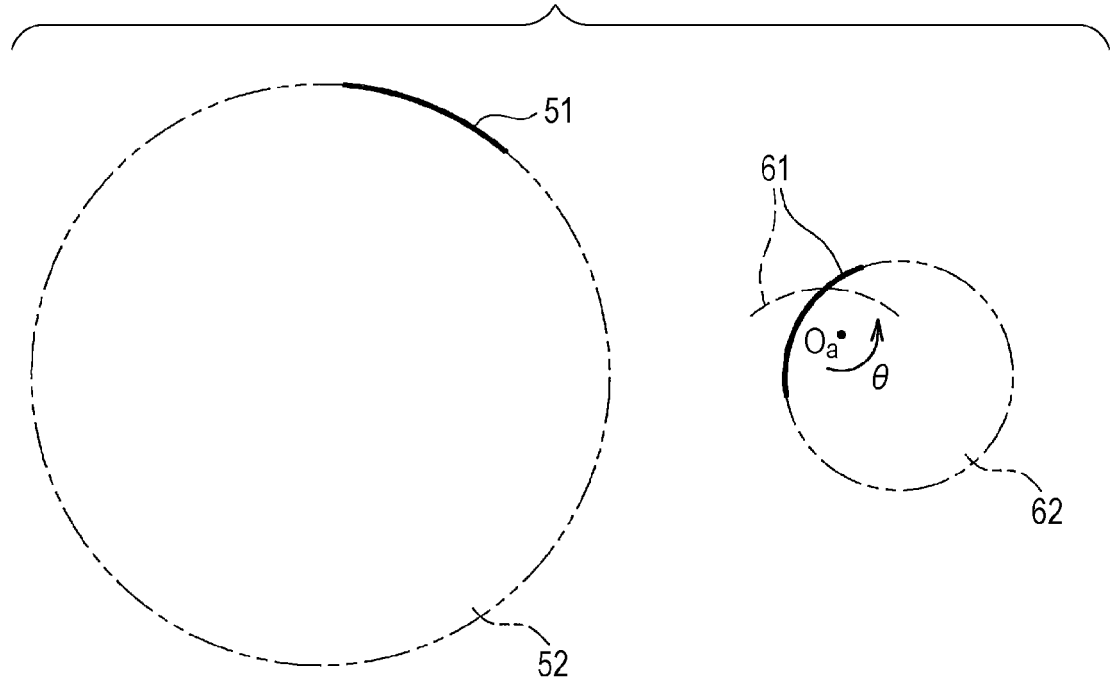
FIG. 7 is a diagram showing a result when a surface shape of the developing roller is rotated in a process of unifying coordinate systems according to one or more embodiments.

As the surface shape 61 rotates by the angle θ, the coordinate systems of the line sensors 10A and 10B are unified in the direction of rotation, as shown in FIG. 7.

In a second step of transforming the coordinate system of the line sensor 10A, the transformer 414 of the measuring device 40 translates the coordinates of each point on the rotated surface shape 61 by the amount equivalent to a relative position ($x_{offset}$, $y_{offset}$). The coordinates of each point on the rotated and translated surface shape 61 are expressed:

$$\begin{pmatrix} \cos\theta & -\sin\theta \\ \sin\theta & \cos\theta \end{pmatrix} \begin{pmatrix} x_i \\ y_i \end{pmatrix} + \begin{pmatrix} x_{offset} \\ y_{offset} \end{pmatrix} \qquad \text{[Mathematical Formula 2]}$$

Figure 8:
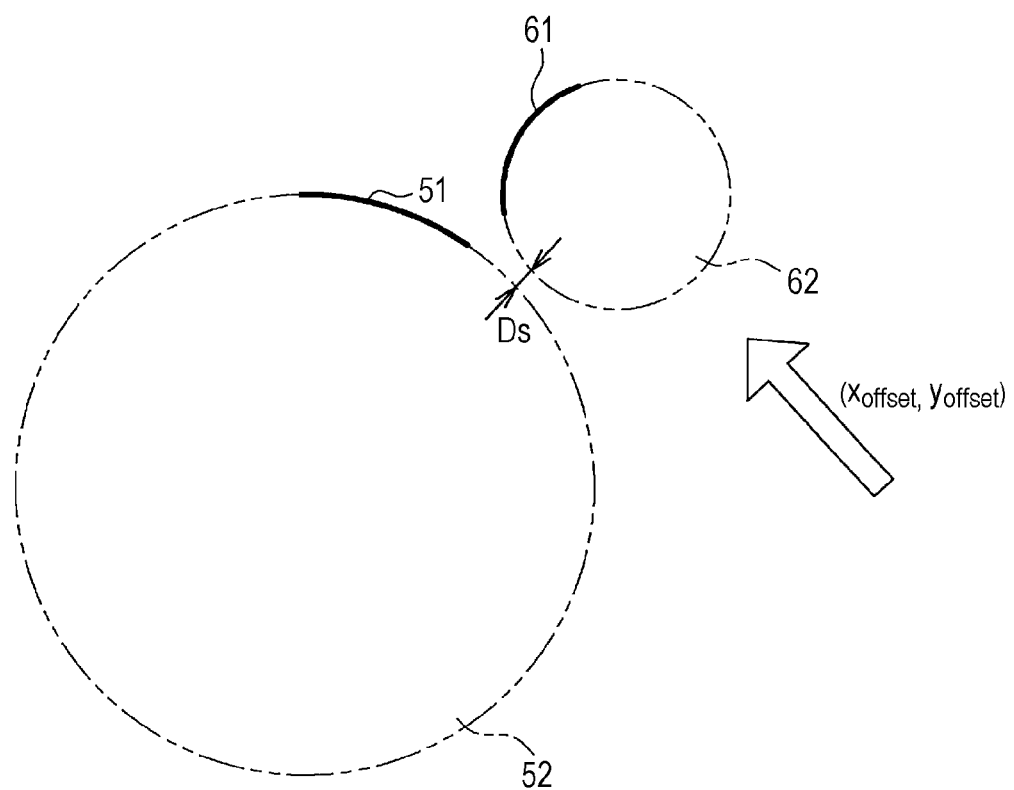
FIG. 8 is a diagram showing a result when a surface shape of the developing roller is translated in a process of unifying coordinate systems according to one or more embodiments.

As the surface shape 61 is translated by the amount equivalent to the relative position ($x_{offset}$, $y_{offset}$), the coordinate systems of the line sensors 10A and 10B are unified as shown in FIG. 8.

Figure 9:
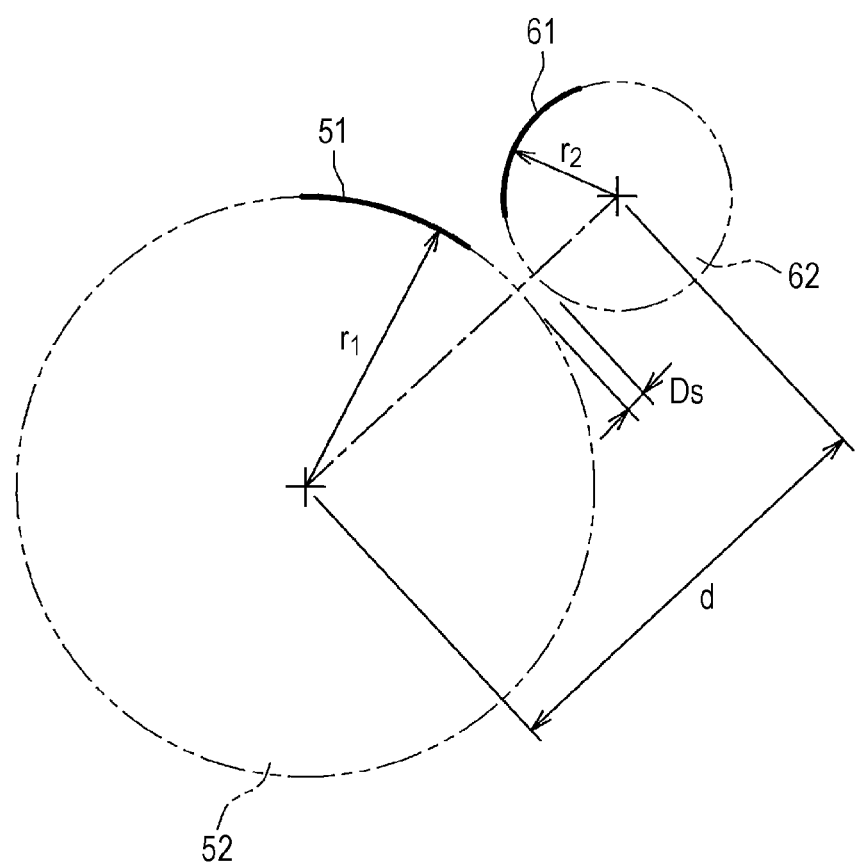
FIG. 9 is a diagram for explaining calculation of a distance between the photosensitive member and the developing roller according to one or more embodiments.

As a result, circular section data 52 including the surface shape 51 and circular section data 62 including the surface shape 61 are identified in the unified coordinate system, as shown in FIG. 9. The distance calculator 415 of the measuring device 40 can calculate the radius $r_1$ of the circular section indicated by the circular section data 52, and the radius $r_2$ of the circular section indicated by the circular section data 62. The distance calculator 415 of the measuring device 40 can also determine the center position of the circular section indicated by the circular section data 52 and the center position of the circular section indicated by the circular section data 62, to calculate the center-to-center distance d. Accordingly, the distance calculator 415 can calculate the distance Ds between the photosensitive member 50 and the developing roller 60 by subtracting the radii $r_1$ and $r_2$ from the center-to-center distance d.

[Measurement of the Angle θ and the Relative Position ($x_{offset}$, $y_{offset}$)]

Figure 10:
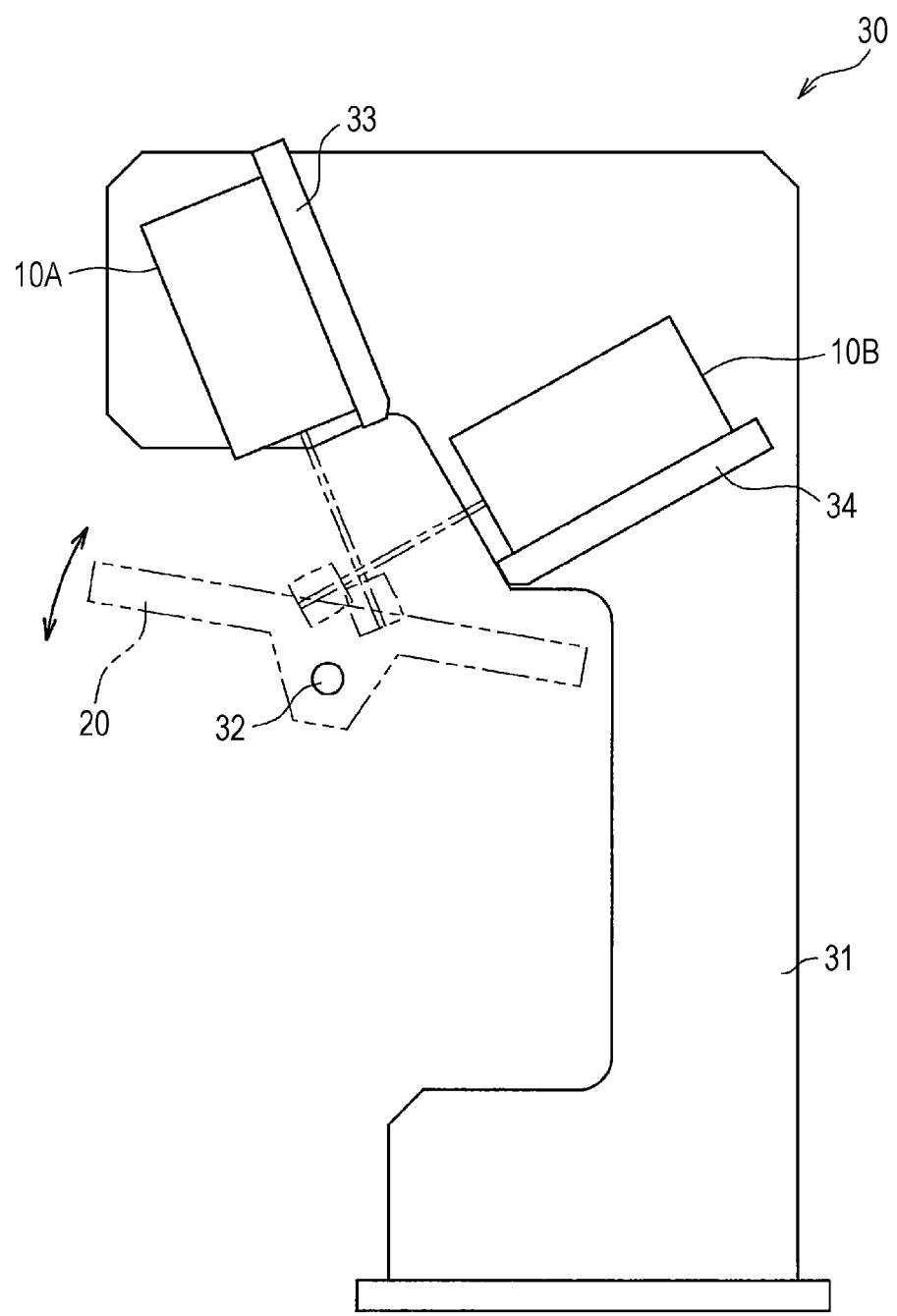
FIG. 10 is a diagram for explaining a method for determining a transform formula to be used for unifying coordinate systems according to one or more embodiments.

For the line sensors 10A and 10B, the method for measuring the angle θ and the relative position ($x_{offset}$, $y_{offset}$) may be a method using a reference plane plate 20 as shown in FIG. 10. For example, the line sensors 10A and 10B are disposed on a sensor holding plate 31 of the assembly jig 30 so as to have a predetermined positional relationship. In this case, when the line sensor 10A is to be attached to the sensor holding plate 31, the line sensor 10A is secured to the sensor holding plate 31, with the line sensor 10A being pressed against a side surface of an attachment plate 33. Likewise, when the line sensor 10B is to be attached to the sensor holding plate 31, the line sensor 10B is secured to the sensor holding plate 31, with the line sensor 10B being pressed against a side surface of an attachment plate 34.

The reference plane plate 20 is held so as to be rotatable about the photosensitive member holding shaft 32. The plane of the reference plane plate 20 is perpendicular to the planes serving as the respective two-dimensional coordinate systems of the line sensors 10A and 10B. At this stage, each of the line sensors 10A and 10B emits laser light on the reference plane plate 20 held at a first inclination angle, to acquire measurement data of a surface shape of the reference plane plate 20. The surface shape calculator 412 of the measuring device 40 can apply the least-squares method to the measurement data acquired from the line sensor 10A, to calculate a first approximate curve that corresponds to the surface of the reference plane plate 20 held at the first inclination angle and forms a predetermined angle with the line sensor 10A. The surface shape calculator 412 can also apply the least-squares method to the measurement data acquired from the line sensor 10B, to calculate the substantially the same first approximate curve that corresponds to the surface of the reference plane plate 20 held at the first inclination angle and forms a predetermined angle with the line sensor 10B. The measuring device 40 can measure the angle θ, using the calculated first approximate curve.

The line sensors 10A and 10B then emit laser light on the reference plane plate 20 held at a second inclination angle different from the first inclination angle, to acquire measurement data of a surface shape of the reference plane plate 20. The surface shape calculator 412 of the measuring device 40 can apply the least-squares method to the measurement data acquired from the respective line sensors 10A and 10B, to calculate a second approximate curve that corresponds to the surface of the reference plane plate 20 held at the second inclination angle. The measuring device 40 can measure the relative position ($x_{offset}$, $y_{offset}$), using the first approximate curve calculated from the reference plane plate 20 held at the first inclination angle and the second approximate curve calculated from the reference plane plate 20 held at the second inclination angle.

Further, it is possible to calculate three or more approximate curves by measuring the reference plane plate 20 held at three or more inclination angles, and measure the relative position ($x_{offset}$, $y_{offset}$) by the least-squares method. Thus, measurement accuracy can be increased.

[Processing]

Figure 11:
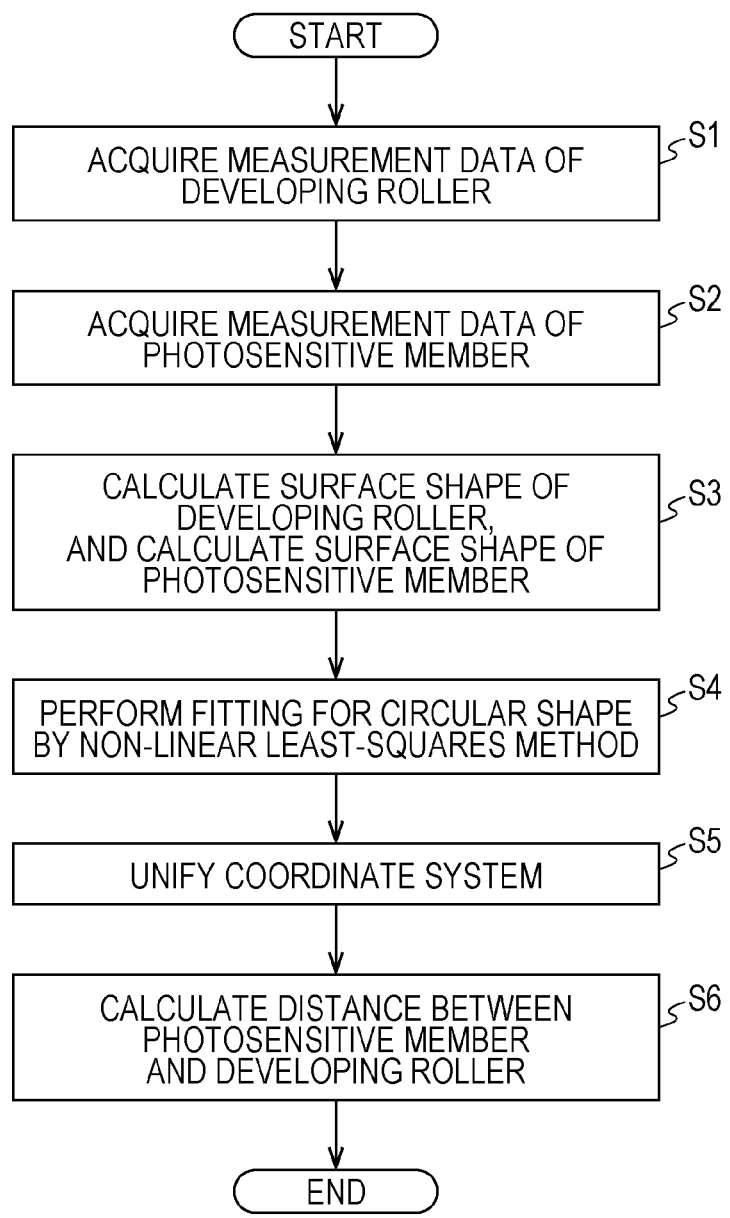
FIG. 11 is a flowchart of a process of measuring a distance between the photosensitive member and the developing roller according to one or more embodiments.

Referring now to FIG. 11, a process to be performed by the measuring device 40 to measure a distance between the photosensitive member 50 and the developing roller 60 is described. This process is a process to be performed in a state in which the photosensitive member 50 and the developing roller 60 are mounted on the assembly jig 30, and is a process to be performed through cooperation between the CPU 41 and a program stored in the ROM 42.

First, the CPU 41 acquires measurement data of the developing roller 60 from the line sensor 10A with the acquirer 411 (step S1). In this step, the measurement data acquired from the line sensor 10A is the data of the two-dimensional coordinates of an arc, and 800 points are acquired, for example. Of the acquired 800-point measurement data, the acquirer 411 eventually acquires 500-point measurement data, excluding 100-point measurement data of the peak portion of the arc in which measurement fluctuation is large, and 200-point measurement data of the both end portions of the arc.

The CPU 41 then causes the acquirer 411 to acquire measurement data of the photosensitive member 50 from the line sensor 10B (step S2). In this step, the measurement data acquired from the line sensor 10B is the data of the two-dimensional coordinates of an arc, and 800 points are acquired, for example. Of the acquired 800-point measurement data, the acquirer 411 eventually acquires 500-point measurement data, excluding 100-point measurement data of the peak portion of the arc in which measurement fluctuation is large, and 200-point measurement data of the both end portions of the arc.

The CPU 41 then causes the surface shape calculator 412 to calculate the surface shape 51 of the photosensitive member 50 and the surface shape 61 of the developing roller 60, on the basis of the measurement data acquired by the acquirer 411 (step S3).

The CPU 41 then causes the fitting calculator 413 to perform fitting for a circular shape by the non-linear least-squares method on the surface shape 51 of the photosensitive member 50 and the surface shape 61 of the developing roller 60 (step S4). In step S4, the data of the circular section including the surface shape 51 of the photosensitive member 50 is obtained, and the center and the radius of the circular section are determined. Also, the data of the circular section including the surface shape 61 of the developing roller 60 is obtained, and the center and the radius of the circular section are determined.

The CPU 41 then causes the transformer 414 to transform the coordinate system of the line sensor 10A into the coordinate system of the line sensor 10B, and thus, unifies the coordinate systems (step S5). Specifically, the transformer 414 rotates the coordinate system of the line sensor 10A by the angle θ, to translates the coordinate system by the amount equivalent to the relative position ($x_{offset}$, $y_{offset}$). In the unified coordinate system, the circular section data 52 including the surface shape 51 and the circular section data 62 including the surface shape 61 are identified (see FIG. 9).

Lastly, the CPU 41 causes the distance calculator 415 to calculate the distance Ds between the photosensitive member 50 and the developing roller 60, using the circular section data 52 and 62 (step S6). Specifically, the distance calculator 415 subtracts the radius $r_1$ of the circular section indicated by the circular section data 52 and the radius $r_2$ of the circular section indicated by the circular section data 62 from the center-to-center distance d between the center of the circular section indicated by the circular section data 52 and the center of the circular section indicated by the circular section data 62, and thus, calculates the distance Ds.

The process shown in FIG. 11 then comes to an end.

It is possible to form an image forming apparatus including the photosensitive member 50 and the developing roller 60 whose distance from each other has been measured and adjusted. In a case where an image forming apparatus in which two developing rollers are attached to one photosensitive member is manufactured, it is possible to form an image forming apparatus including another developing roller in addition to the photosensitive member 50 and the developing roller 60 whose distance from each other has been measured and adjusted.

According to one or more embodiments, laser light emitted from the line sensor 10A toward the developing roller 60 is reliably received by the line sensor 10A without being blocked by any other component included in the image forming apparatus. Also, laser light emitted from the line sensor 10B toward the photosensitive member 50 is reliably received by the line sensor 10B without being blocked by any other component included in the image forming apparatus.

Thus, the distance between the photosensitive member 50 and the developing roller 60 can be measured.

The above applies not only to the photosensitive member 50 and the developing roller 60 but also to any two measurement targets having any appropriate shapes, and it is possible to measure a distance between the two measurement targets.

In particular, when the measurement data is the data of two-dimensional coordinates indicating a surface portion of the measurement targets, a distance between the measurement targets can be measured with high accuracy.

In the above embodiments, a distance between one photosensitive member and one developing roller is measured with two line sensors. In one or more embodiments, however, respective distances between one photosensitive member and two developing rollers are collectively measured with four line sensors.

Figure 12:
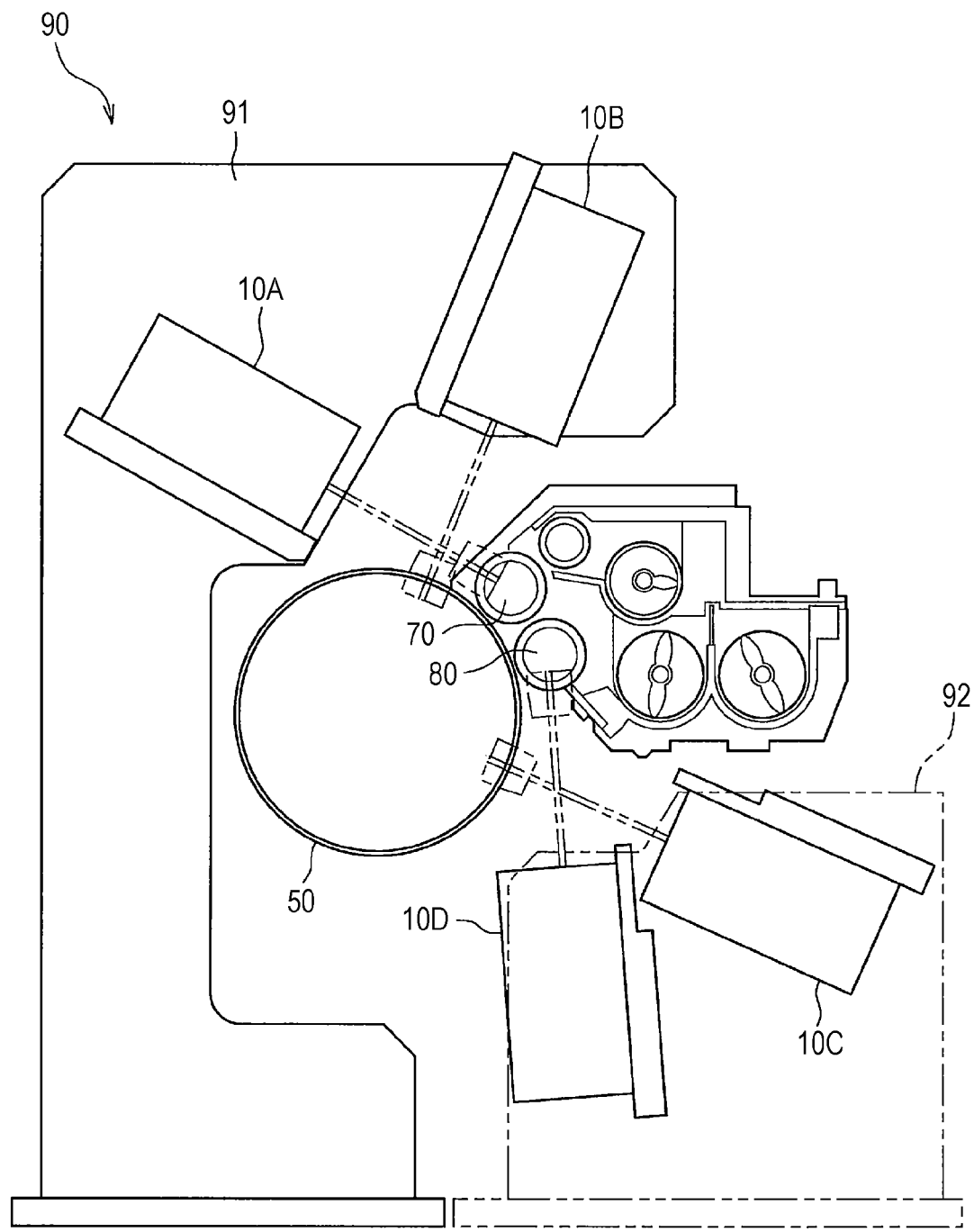
FIG. 12 is a diagram of a measurement system for collectively measuring a distance between a photosensitive member and each of two developing rollers according to one or more embodiments.
Figure 13:
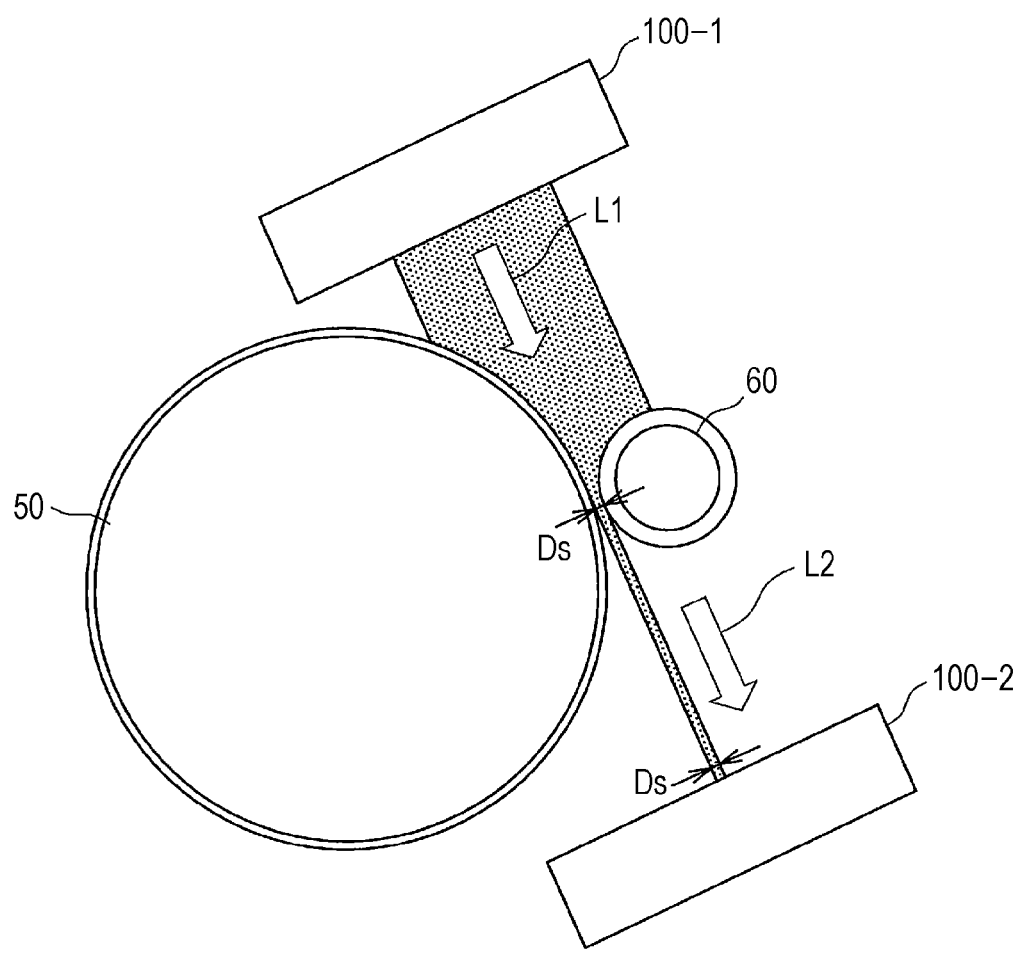
FIG. 13 is a diagram for explaining a conventional distance measuring method according to one or more embodiments.
Figure 14:
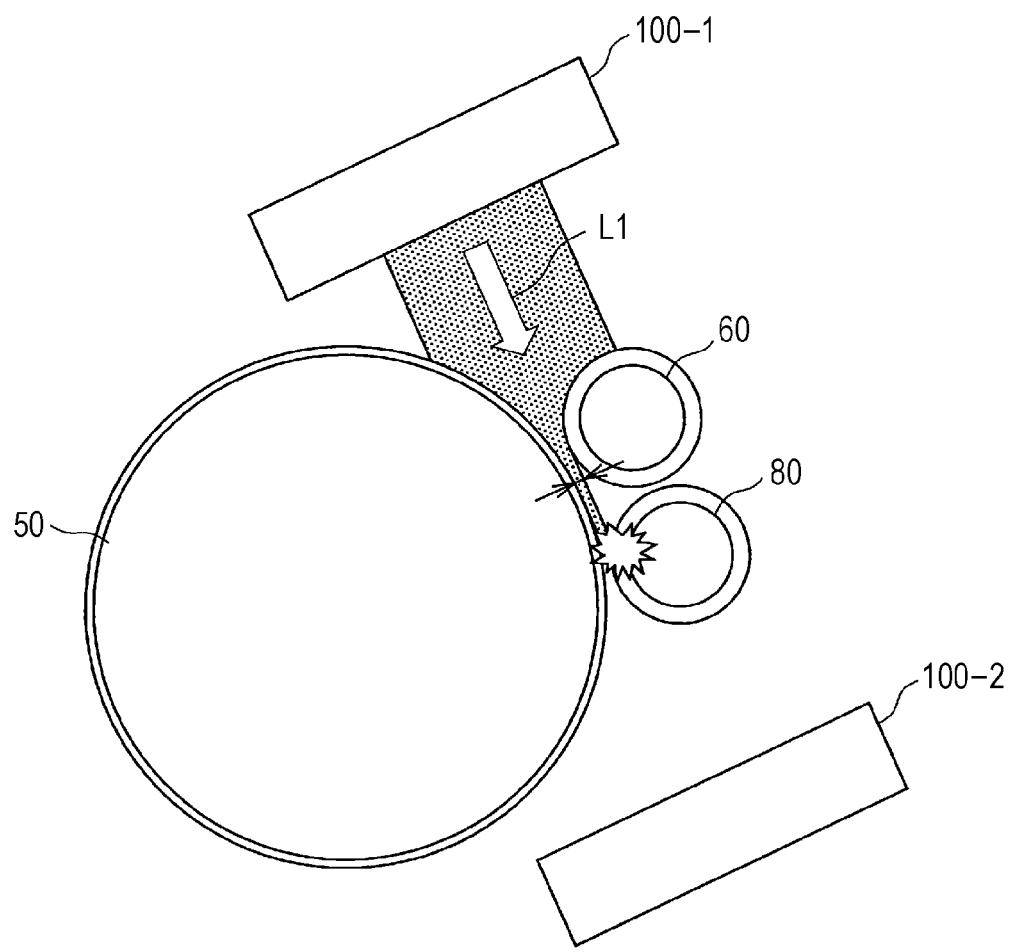
FIG. 14 is a diagram for explaining an example in which the conventional distance measuring method is used in a case where two developing rollers are attached to one photosensitive member according to one or more embodiments.

FIG. 12 shows the configuration of an assembly jig 90 to be used for distance adjustment in assembling an image forming apparatus in which two developing rollers 70 (a first developing roller, or a first measurement target) and 80 (a second developing roller, or a third measurement target) are provided for the photosensitive member 50.

The assembly jig 90 includes sensor holding plates 91 and 92.

The line sensors 10A and 10B described above are disposed on the sensor holding plate 91, and a line sensor 10C (a third line sensor) and a line sensor 10D (a fourth line sensor) are disposed on the sensor holding plate 92. The line sensors 10C and 10D are components that are the same as the line sensors 10A and 10B. The line sensor 10A is used to measure a surface shape of the developing roller 70. The line sensor 10B is used to measure a surface shape of the photosensitive member 50. The line sensor 10C is used to measure a surface shape of the photosensitive member 50. The line sensor 10D is used to measure a surface shape of the developing roller 80.

For each of the three pairs of the line sensors 10A and 10B, the line sensors 10C and 10D, and the line sensors 10B and 10C, the angle between the same coordinate axes of the two line sensors, and the relative positions of the origins of the two line sensors are calculated in advance. With the calculated angles and relative positions, measurement data acquired from the four line sensors can be expressed in the same coordinate system, on the basis of the positional relationship among the three pairs of line sensors.

The measuring device 40 calculates a distance between the photosensitive member 50 and the developing roller 70, on the basis of the surface shape of the developing roller 70 measured by the line sensor 10A and the surface shape of the photosensitive member 50 measured by the line sensor 10B.

The measuring device 40 also calculates a distance between the photosensitive member 50 and the developing roller 80, on the basis of the surface shape of the photosensitive member 50 measured by the line sensor 10C and the surface shape of the developing roller 80 measured by the line sensor 10D.

According to one or more embodiments, respective distances between the photosensitive member 50 and the two developing rollers 70 and 80 can be measured. The above applies not only to the photosensitive member 50 and the developing rollers 70 and 80 but also to any three or more measurement targets having any appropriate shapes, and it is possible to measure distances among measurement targets of different kinds.

«Modifications» a) The shape of a measurement target is not necessarily a cylindrical shape like the shape of a photosensitive member or a developing roller, but may be a columnar shape, a polygonal cylinder-like shape, a pillar-like shape, or a spherical shape.

b) In one or more embodiments, after a surface shape is measured and a circular section is determined, the radius of a photosensitive member and the radius of a developing roller are calculated. However, the radius of a photosensitive member and the radius of a developing roller may be known beforehand. In this case, the values that need to be calculated are only the centers of two circular sections and the distance between the centers. Accordingly, the calculation load for measuring a distance between the photosensitive member and the developing roller can be reduced.

c) The assembly jigs 30 and 90 can hold the line sensors 10A through 10D in such a manner that the line sensors 10A through 10D can move, and can set the line sensors 10A through 10D at any appropriate positions. Therefore, the positions of the line sensors 10A through 10D are change on the assembly jigs 30 and 90 as appropriate, so that a surface shape of a photosensitive member and a surface shape of a developing roller can be measured more than once, and the accuracy of distance measurement can be increased.

d) As for a combination of measurement targets in measurement of a distance, a cylindrical body and a developing roller having the same dimensions as a photosensitive member may be used, a cylindrical body and a photosensitive member having the same dimensions as a developing roller may be used, or a cylindrical body having the same dimensions as a photosensitive member and a cylindrical body having the same dimensions as a developing roller may be used, for example.

e) In one or more embodiments, the line sensors 10A through 10D are held by the plate-like assembly jigs 30 and 90, and accordingly, the coordinate planes formed by the respective coordinate systems of the line sensors 10A through 10D are the same. However, even if the line sensors 10A through 10D are displaced by a predetermined amount with respect to the central shaft of the photosensitive member, and the respective coordinate planes of the line sensors 10A through 10D become parallel, for example, it is possible to measure a distance between the photosensitive member and the developing roller.

f) A technique that combines various techniques described above in one or more embodiments can also be developed as appropriate.

g) Other than the above, changes may be made to hardware, flowcharts, and the like, without departing from the scope of the present invention.

Although the embodiments of the present invention have been described and illustrated in detail, the disclosed embodiments are made for purposes of illustration and example only and not limitation. The scope of the present invention should be interpreted by terms of the appended claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A measuring device that measures a distance between a first measurement target and a second measurement target, the measuring device comprising:
    a central processing unit (CPU) that:
        calculates a first surface shape of the first measurement target based on first measurement data acquired from a first line sensor that emits first laser light to the first measurement target,
        calculates a second surface shape of the second measurement target based on second measurement data acquired from a second line sensor that emits second laser light to the second measurement target,
        form a unified coordinate system by transforming at least one of a first coordinate system of the first line sensor and a second coordinate system of the second line sensor, and
        calculates a distance between the first measurement target and the second measurement target in the unified coordinate system.

2. The measuring device according to claim 1, wherein
the first measurement data is data of two-dimensional coordinates indicating a shape of a first surface portion of the first measurement target,
the first surface portion is irradiated with the first laser light in a belt-like form,
the second measurement data is data of two-dimensional coordinates indicating a shape of a second surface portion of the second measurement target, and
the second surface portion is irradiated with the second laser light in a belt-like form.

3. The measuring device according to claim 1, wherein, with an assembly jig that holds the first line sensor and the second line sensor in a movable manner, the CPU calculates the first surface shape a plurality of times, and calculate the second surface shape a plurality of times.

4. The measuring device according to claim 1, wherein
the first surface shape is a cylindrical surface shape, and the second surface shape is a cylindrical surface shape.

5. The measuring device according to claim 4, wherein
the CPU calculates a first circular section by performing fitting according to a non-linear least-squares method on the cylindrical surface shape of the first measurement target, and calculates a second circular section by performing fitting according to the non-linear least-squares method on the cylindrical surface shape of the second measurement target.

6. The measuring device according to claim 5, wherein
the CPU places the first circular section and the second circular section in the unified coordinate system based on a premeasured relative positional relationship between the first coordinate system and the second coordinate system.

7. The measuring device according to claim 6, wherein
the CPU subtracts a first radius of the first circular section and a second radius of the second circular section from a center-to-center distance between the first circular section and the second circular section, to calculate a distance between the first measurement target and the second measurement target.

8. The measuring device according to claim 7, wherein
based on the first radius and the second radius, the CPU performs the fitting according to the non-linear least-squares method.

9. The measuring device according to claim 1, wherein
the first measurement target is a first developing roller used in an image forming apparatus, and the second measurement target is a photoreceptor used in the image forming apparatus.

10. The measuring device according to claim 9, wherein
a third measurement target is a second developing roller used in the image forming apparatus, and
a distance between the photoreceptor and the first developing roller, and a distance between the photoreceptor and the second developing roller are measured with a third line sensor that emits third laser light to the photoreceptor as the second measurement target, and a fourth line sensor that emits fourth laser light to the second developing roller as the third measurement target, in addition to the first line sensor that emits the first laser light to the first developing roller as the first measurement target, and the second line sensor that emits the second laser light to the photoreceptor as the second measurement target.

11. An image forming apparatus comprising:
the measuring device according to claim 10, wherein
the measuring device measures and adjusts a distance between the photoreceptor and the first developing roller, and a distance between the photoreceptor and the second developing roller.

12. A measuring method implemented by a measuring device that measures a distance between a first measurement target and a second measurement target, the measuring method comprising:
    calculating a first surface shape of the first measurement target based on first measurement data acquired from a first line sensor that emits first laser light to the first measurement target, and calculating a second surface shape of the second measurement target based on second measurement data acquired from a second line sensor that emits second laser light to the second measurement target;
    transforming at least one of a first coordinate system of the first line sensor and a second coordinate system of the second line sensor, to form a unified coordinate system; and
    calculating a distance between the first measurement target and the second measurement target in the unified coordinate system.

* * * * *